UNITED STATES PATENT OFFICE.

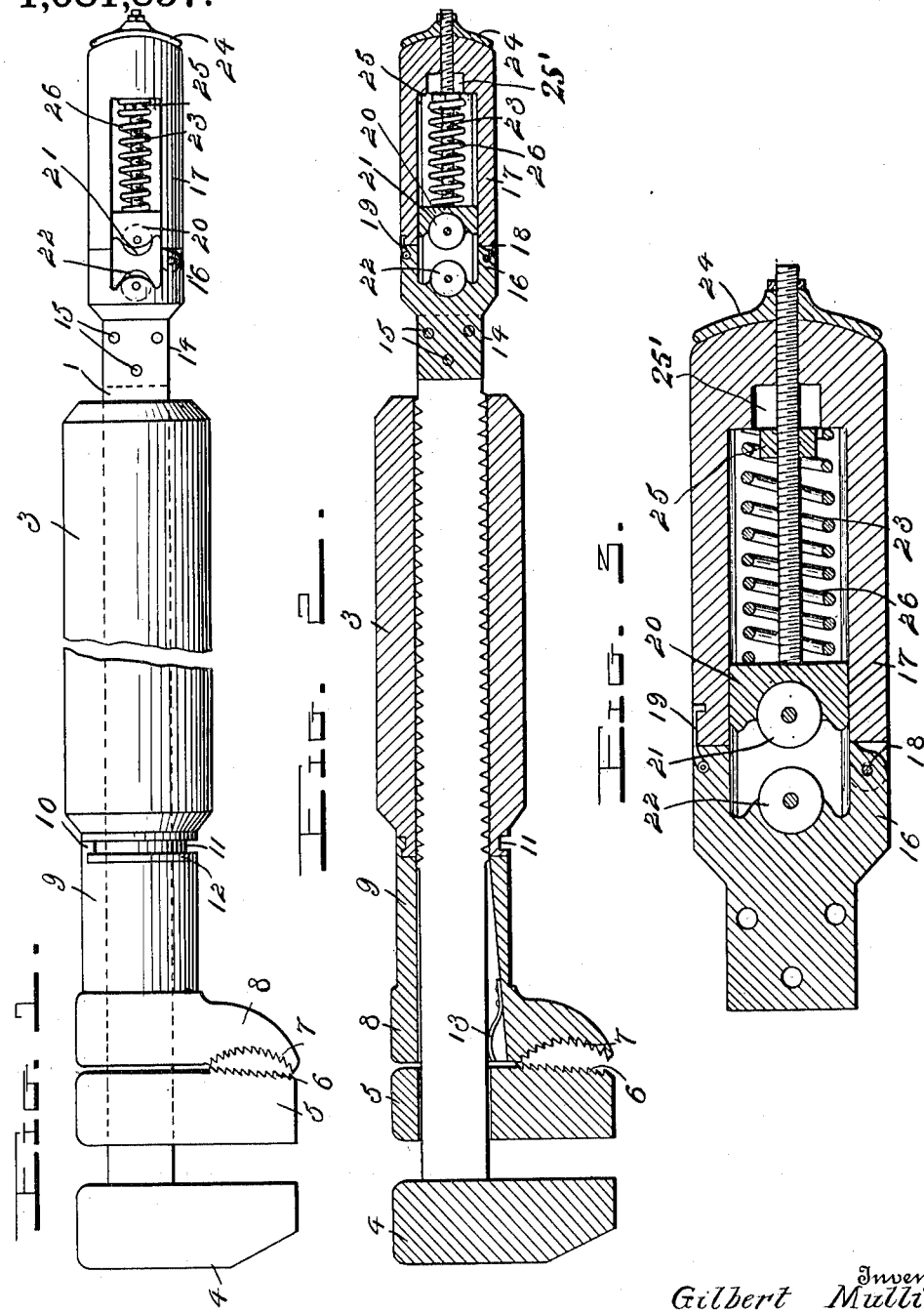

GILBERT MULLINS, OF LEAVENWORTH, KANSAS, ASSIGNOR OF ONE-HALF TO JOHN FRANK, OF LEAVENWORTH, KANSAS.

PIPE OR ROD CUTTER.

1,081,857. Specification of Letters Patent. Patented Dec. 16, 1913.

Application filed August 26, 1911. Serial No. 646,099.

*To all whom it may concern:*

Be it known that I, GILBERT MULLINS, a citizen of the United States, residing at Leavenworth, in the county of Leavenworth and State of Kansas, have invented new and useful Improvements in Pipe or Rod Cutters, of which the following is a specification.

This invention relates to pipe or rod cutters, which as is shown is in the nature of an attachment removably secured to one end of the shank of a wrench, which forms the handle therefor.

Further objects of the invention will appear as the following specific description is read in connection with the accompanying drawing, which forms a part of this application, and in which:—

Figure 1 is a side elevation. Fig. 2 is a longitudinal section. Fig. 3 is a side elevation, partly in section, of the pipe cutting attachment.

Referring more particularly to the drawing, 1 represents an elongated shank of the wrench which is threadedly adjustable in the handle 3. The shank is provided at its outer end with a jaw 4 and has its opposite end bifurcated as at 14 and extended beyond the outer end of the handle 3. Secured within the bifurcated portion of the shank by means of screws 15 or other similar devices, is a two part frame, shown at 16 and 17. The parts 16 and 17 have one side hinged together as shown at 18, and the frame latched by a hook 19 which is pivoted upon the part 16, and engages an aperture in the part 17, and arranged to lie flush with the side of the frame.

The sides of the portion 17 are internally grooved, and slidably mounted in the grooves is a block 20 carrying a cutting roller 21 which coacts with a similar roller 22, carried by the part 16, to sever a pipe. The block 20 is rigidly secured to one end of the screw 23 which passes through a non-threaded bore in the closed end of the part 17 for slidable movement therethrough, and has threadedly secured to its free end a curved plate 24 which normally engages the closed end of the part 17 and serves as a handle for retracting the cutter 21. A nut 25 is threaded upon the screw and adapted to work in the recess 25′ of the part 17 to limit the outward movement of the cutter 21. A spiral spring 26 surrounds the screw and has one of its ends bearing against the end of the part 17, and its opposite end engaging the block 20 and operating to force the block 20 with its associated roller toward the roller 22, and thus preventing casual backward sliding of the block 20.

In operation of the pipe cutting device, the hook 19 is released from the aperture in the part 17 and this part swung back on its pivot 18 until sufficient room is provided for the insertion of the pipe between the cutters. The cutter 21 is then withdrawn by means of the plate 24 and the part 17 swung into latched position, after which the plate 24 is released which permits the spring 26 to force the cutter 21 forwardly into engagement with the pipe. It will of course be understood that a spring of sufficient strength is used to maintain the roller in effective engagement with the pipe to sever the same, and that the nut 25 may be adjusted upon the screw 23 to vary the degree of opening between the rollers to accommodate pipes of different diameters.

What I claim is:—

In a pipe cutter, a casing comprising a stationary member and a movable member hingedly secured to said stationary member and provided with a recess in the end thereof, means for securing said members together, a cutter journaled in said stationary member, a block slidable within said movable member, a cutter journaled in said block, a screw connected with said block and extending through said recess and the end of said movable member, a spring surrounding said screw and yieldingly pressing said block, a plate threadedly secured to the free end of said screw for sliding said block, and a nut adjustably mounted on said screw for coöperation with said recess, substantially as and for the purpose set forth.

In testimony whereof I affix my signature in presence of two witnesses.

GILBERT MULLINS.

Witnesses:
 THOS. C. TAYLOR,
 LEWIS E. WOOD.

Copies of this patent may be obtained for five cents each, by addressing the "Commissioner of Patents, Washington, D. C."